United States Patent
Moosavi et al.

(10) Patent No.: US 10,390,363 B2
(45) Date of Patent: Aug. 20, 2019

(54) UPLINK SCHEDULING IN WIRELESS COMMUNICATION NETWORKS

(71) Applicant: Telefonaktiebolaget LM Ericsson (publ), Stockholm (SE)

(72) Inventors: Reza Moosavi, Linköping (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 15/526,946

(22) PCT Filed: Sep. 15, 2015

(86) PCT No.: PCT/SE2015/050968
§ 371 (c)(1),
(2) Date: May 15, 2017

(87) PCT Pub. No.: WO2017/048162
PCT Pub. Date: Mar. 23, 2017

(65) Prior Publication Data
US 2017/0339716 A1 Nov. 23, 2017

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0048* (2013.01); *H04L 1/1671* (2013.01); *H04L 5/0055* (2013.01);
(Continued)

(58) Field of Classification Search
CPC ... H04L 5/0048; H04L 5/0055; H04L 5/0057; H04L 1/1671; H04L 5/0094; H04L 5/00;
(Continued)

(56) References Cited

U.S. PATENT DOCUMENTS

| | | | |
|---|---|---|---|
| 8,428,018 B2* | 4/2013 | Noh | H04B 7/0452 370/208 |
| 8,599,819 B2* | 12/2013 | Kim | H04L 5/0048 370/329 |

(Continued)

FOREIGN PATENT DOCUMENTS

| | | |
|---|---|---|
| EP | 2077677 A1 | 7/2009 |
| EP | 2582195 A1 | 4/2013 |
| WO | 2006124042 A1 | 11/2006 |

OTHER PUBLICATIONS

3GPP, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.0.0, Dec. 1-23, 2007.

(Continued)

*Primary Examiner* — Man U Phan
(74) *Attorney, Agent, or Firm* — Patent Portfolio Builders, PLLC

(57) ABSTRACT

A method for operating a wireless network node (10) in a wireless communication network (1) comprises providing (S10) at least one wireless communication device (20) with an indication of a set of reciprocity reference signals, RRS, to be used for scheduling request, SR, transmission. The method further comprises performing (S20) an estimation of an uplink channel on which a scheduling request, SR, is received from a wireless communication device (20), wherein the estimation of the uplink channel is based on an RRS comprised in the received SR.

21 Claims, 12 Drawing Sheets

(51) Int. Cl.
  *H04W 28/02* (2009.01)
  *H04W 88/08* (2009.01)
  *H04L 1/16* (2006.01)
(52) U.S. Cl.
  CPC .......... *H04L 5/0057* (2013.01); *H04L 5/0094* (2013.01); *H04W 28/0278* (2013.01); *H04W 88/08* (2013.01)
(58) Field of Classification Search
  CPC .. H04W 28/0278; H04W 72/14; H04W 88/08
  USPC ........................................................ 370/329
  See application file for complete search history.

(56) References Cited

U.S. PATENT DOCUMENTS

| | | | |
|---|---|---|---|
| 8,902,876 B2 * | 12/2014 | Kim ...................... | H04L 5/0048 370/329 |
| 9,019,983 B2 * | 4/2015 | Maeda .................. | H04W 76/11 370/437 |
| 9,084,238 B2 * | 7/2015 | Gao ....................... | H04L 5/0016 |
| 9,385,906 B2 * | 7/2016 | Noh ....................... | H04B 7/0452 |
| 9,635,656 B2 * | 4/2017 | Maeda .................. | H04W 76/11 |
| 10,135,596 B2 * | 11/2018 | Wang ................... | H04L 1/1692 |
| 10,165,558 B2 * | 12/2018 | Maeda .................. | H04W 76/11 |
| 2010/0080154 A1 | 4/2010 | Noh et al. | |
| 2010/0103902 A1 | 4/2010 | Kim et al. | |
| 2017/0264414 A1 * | 9/2017 | Froberg Olsson ... | H04B 7/0413 |
| 2018/0084586 A1 * | 3/2018 | McCoy ............. | H04W 74/0833 |
| 2018/0115357 A1 * | 4/2018 | Park ......................... | H04B 7/04 |
| 2018/0123654 A1 * | 5/2018 | Park ......................... | H04B 7/04 |
| 2018/0123657 A1 * | 5/2018 | Kundargi ............. | H04B 7/0452 |
| 2018/0309554 A1 * | 10/2018 | Moosavi ............... | H04L 5/0051 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 10) The present document has been developed within the 3rd Generation Par", 3GPP TS 36.211 V10.0.0, Dec. 2010, 1-103.

* cited by examiner

UPLINK SCHEDULING IN WIRELESS COMMUNICATION NETWORKS

TECHNICAL FIELD

The proposed technology generally relates to transmission and reception in wireless communication networks and more specifically to scheduling of uplink resources in wireless communication networks.

BACKGROUND

Very Large Antenna Systems

Due to recent technology and standardization development, introducing large antenna arrays at cellular base stations and other wireless access points has become a viable option to boost the capacity and user data rates. A base station (BS) or an access point (AP) equipped with excessive number of antennas, can simultaneously schedule multiple user equipment (UEs) at the same time/frequency band with simple linear processing such as maximum-ratio transmission (MRT) or zero-forcing (ZF) in the downlink (DL) and maximum-ratio combining (MRC) or ZF in the uplink (UL). This is often referred to as very-large (or full dimension, FD) multiple-input multiple-output (VL-MIMO) or massive MIMO in the literature. The gains with VL-MIMO are achieved without consuming any additional spectrum. Additionally, the radiated energy efficiency with VL-MIMO can be substantially improved. Recognizing the technology potential, the 3GPP has defined a work item on VL-MIMO.

A key usage of VL-MIMO technology is (extreme) narrow beam forming for DL transmissions, that enables a BS to focus the transmitted energy to the desired UE rather and thereby boosting the coverage and user data rates for DL transmissions. For VL-MIMO systems it is not trivial how to acquire channel state information (CSI) in a scalable fashion, which is essential to gain the performance potentials of excessive amount of transmit antennas. Traditional schemes where each UE continuously measures on the pilot (reference) symbols transmitted by the BS during downlink transmission phase to estimate the downlink channel gain and feeds it back to the BS via a reverse link, would not work in VL-MIMO systems. This is so because the number of required pilots in the downlink is proportional to the number of BS antennas, and hence feedback based schemes are not scalable. Existing solutions to this problem operate in the time-division duplex (TDD) mode and rely on the channel reciprocity between the uplink and the downlink. Note that in order to guarantee UL/DL channel reciprocity some hardware calibrations might be needed in practice. Then, the channel estimate of the uplink direction at the transmitter can directly be utilized in the downlink.

Wireless Channel Sounding

In existing systems, wireless channel sounding refers to the mechanism that enables a wireless device access point or BS to obtain wideband uplink channel state information in parts of the spectrum, in which currently no wireless data transmission is taking place. Specifically, in cellular systems, a BS has at least two usages of wideband channel sounding:

To acquire UL channel state information in frequency and time resources in which a UE is currently not scheduled (even though the UE may currently use other parts of the spectrum);

To acquire UL channel state information of UEs that are currently not transmitting uplink data.

In Long-Term Evolution (LTE), channel sounding is done via the so-called sounding reference signals (SRS) transmitted by each UE. The exact structure of the SRS can be found in [1] but in short, the SRS is transmitted at the last Orthogonal Frequency-Division Multiplex (OFDM) symbol during UL as frequency reference signals inserted into every second subcarrier creating a comb-like spectrum. The minimum SRS bandwidth is 4 resource blocks (720 KHz). There exist two types of SRS transmissions:

1) Periodic SRS: In which, the UE is transmitted SRS with a given configured periodicity (can be as often as once every 2 ms to once every 160 ms).
2) Aperiodic SRS: In which, the UE transmits SRS upon receiving explicit command through Physical Downlink Control Channel (PDCCH) signaling.

Demodulation Reference Signal

In existing systems, demodulation reference signals (DMRS) are used to enable the coherent demodulation of the transmitted data. More precisely, the DMRS is inserted in-band with the data so that it goes through the same processing chain as does the data, which ultimately enables the coherent demodulation of the data. Herein, the data includes any type of information to be communicated including DL payload data (transmitted for example in LTE physical downlink shared channel—PDSCH), UL payload data (transmitted for example in LTE physical uplink shared channel—PUSCH), DL control signaling (transmitted in LTE physical downlink control channel—PDCCH) and UL control signaling (transmitted in LTE physical uplink control channel—PUCCH).

Note: For the ongoing 5G discussions, the nomenclature and definition of uplink pilot/reference signals are not yet decided. However, since both UL SRS and UL DMRS have very similar structures, it is predicted that the UL SRS and UL SRS are merged into a single UL reference signal. Additionally, since VL-MIMO is a key component of 5G and since in VL-MIMO systems DL channel knowledge is obtained via uplink channel sounding, sufficient UL SRS-type pilot signals are necessary in 5G. We call these pilots Reciprocity Reference Signals (RRS) throughout the rest of this disclosure. Observe that, to accommodate more UEs in 5G, there might be a need to introduce further enhancements to the current SRS structure in order to be able to use SRS as RRS. For instance, more comb structures might be introduced, or we might allow RRS transmission to take place in several OFDM symbols (as opposed to SRS transmission which occupied the last OFDM symbol).

Hybrid Automatic Repeat Request

To facilitate reliable data transmission, there is a need to retransmit the erroneously received packets. This is done with the help of Automatic Repeat Request (ARQ) or Hybrid-Automatic Repeat Request (HARQ) mechanisms. The basic idea is that the receiver, upon reception of a new error-free packet, sends a positive acknowledgement (ACK) to the transmitter via a reverse link to inform the error-free reception of the packet and correspondingly a negative acknowledgement (NACK) to inform that the packet is in error in case that the packet is received erroneously. Then the transmitter retransmits the packets for which it has received NACK.

In LTE, the ACK/NACK signals corresponding to the UL payload transmissions are transmitted in the so-called Physical HARQ Indicator Channel (PHICH). In the UL, the ACK/NACK messages are transmitted either on the Physical Uplink Control Channel (PUCCH) or together with payload data on Physical Uplink Share Channel (PUSCH) depending on whether the UE has an active UL session with the BS, see [2] for more information.

Scheduling Request (SR)

A Long-Term Evolution (LTE) UE is configured by the network with one particular code and time/frequency resource which together constitute a Scheduling Request (SR). The UE will then request scheduling of uplink resources (PUSCH) by sending a PUCCH message on its given SR resources. The network, upon receiving the SR, will respond via a scheduling grant which specifies the UE identity and the UL resources that are assigned to the UE. For further details, see Section 5.4.4 of [2].

If the network node knows the downlink channel towards the UE, then it can efficiently use this knowledge to more effectively transmit the response. This gain is especially high in VL-MIMO systems where the BS is equipped with 100-400 antennas. As described above, for VL-MIMO systems, it is not trivial how to acquire channel state information (CSI) in a scalable fashion. Therefore there is a need, especially in 5G, for a more efficient procedure for UL scheduling request.

SUMMARY

It is an object to provide methods and wireless nodes for scheduling of uplink resources in a wireless communication network.

This and other objects are met by embodiments of the proposed technology.

An aspect of the embodiments relates to a method for operating a wireless network node in a wireless communication network. The method comprises providing at least one wireless communication device with an indication of a set of reciprocity reference signals, RRS, to be used for scheduling request, SR, transmission. The method further comprises performing an estimation of an uplink channel on which a scheduling request, SR, is received from a wireless communication device, wherein the estimation of the uplink channel is based on an RRS comprised in the received SR.

Another aspect of the embodiments relates to a method for operating a wireless communication device in a wireless communication network. The method comprises receiving an indication of a set of reciprocity reference signals, RRS, to be used for scheduling request, SR, transmission. The method further comprises transmitting a scheduling request, SR, using an RRS selected from the indicated set of RRS for transmission of the SR.

Yet another aspect of the embodiments relates to a network node configured to operate in a wireless communication network. The wireless network node is configured to provide at least one wireless communication device with an indication of a set of reciprocity reference signals, RRS, to be used for scheduling request, SR, transmission. The wireless network node is further configured to perform an estimation of an uplink channel on which a scheduling request, SR, is received from a wireless communication device, wherein the estimation of the uplink channel is based on an RRS comprised in the received SR.

Yet another aspect of the embodiments relates to a wireless communication device configured to operate in a wireless communication network. The wireless communication device is configured to receive an indication of a set of reciprocity reference signals, RRS, to be used for scheduling request, SR, transmission. The wireless communication device is further configured to transmit a scheduling request, SR, using an RRS selected from the indicated set of RRS for transmission of the SR.

An advantage of the proposed technology is that very short latency is enabled since it is possible for the UEs to share RRS resources.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
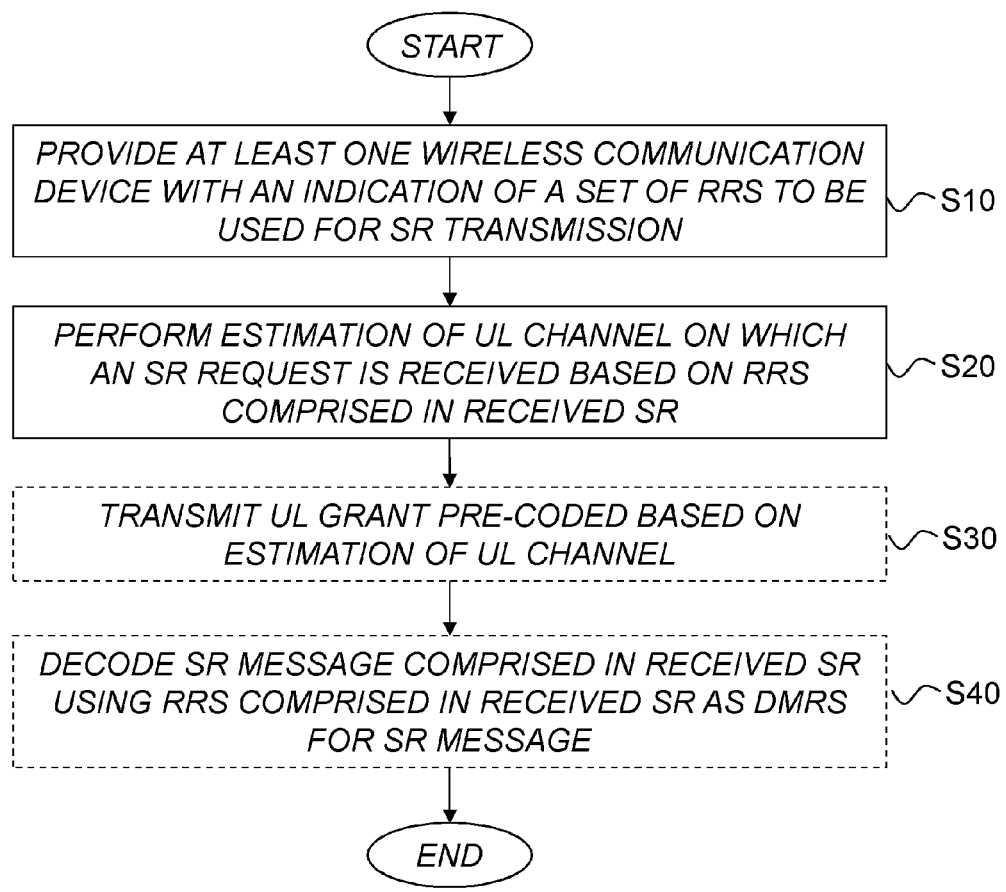
FIG. 1 is a schematic flow diagram illustrating an example of a method for operating a wireless network node in a wireless communication network according to an embodiment.

Throughout the drawings, the same reference designations are used for similar or corresponding elements.

For a better understanding of the proposed technology, it may be useful to begin with a brief system overview and/or analysis of the technical problem.

As described above, an LTE UE is configured by the network with one particular code and time/frequency resource which together constitute a scheduling Request (SR). The UE will then request scheduling of uplink resources from a network node, e.g. a BS. Once a UE transmits an SR, given that there exist enough UL resources to be assigned to the UE, the network node needs to transmit the scheduling grant to the UE in the downlink. If the network node knows the downlink channel, it can adopt its transmission parameters and achieves a better spectral and power efficiency in sending the UL scheduling grant. This is especially pronounced in VL-MIMO systems where the BS is equipped with 100-400 antennas. In fact, if the BS knows the DL channel it can gain about 10 times in transmission efficiency compared to not knowing the DL channel with 100 antennas. Therefore, it is very important to know the signal properties of the DL channel as accurately as possible, i.e. to make a good choice for the transmission parameters.

For VL-MIMO systems it is not trivial how to acquire channel state information (CSI) in a scalable fashion, which is essential to gain the performance potentials of excessive amount of transmit antennas. Traditional schemes where each UE continuously measures on the pilot (reference) symbols transmitted by the BS during downlink transmission phase to estimate the downlink channel gain and feeds it back to the BS via a reverse link, would not work in VL-MIMO systems. This is so because the number of required pilots in the downlink is proportional to the number of BS antennas, and hence feedback based schemes are not scalable. Existing solutions to this problem operate in the time-division duplex (TDD) mode and rely on the channel reciprocity between the uplink and the downlink. Then, the channel estimate of the uplink direction at the transmitter can directly be utilized in the downlink. More precisely, each UE transmits reference signals in the uplink phase which we refer to as reciprocity reference signals (RRS), as discussed earlier. The RRS transmitted by each UE is then used by the BS to estimate both the uplink and downlink wireless channel of the given UE. The number of uplink pilots in these schemes is proportional to the number of UEs, which are typically smaller than the number of BS antennas.

In contrast to currently deployed cellular and wireless systems, in which CSI for DL transmission is obtained by feedback signaling of measurement on DL reference signals, in future full dimension and very large MIMO systems, such CSI information must be acquired based on UL sounding reference signals transmitted by end user devices. To ensure a high quality CSI estimate, uplink RRS by user devices need to be transmitted sufficiently often with respect to the coherence time of the channel. This means that a fair amount of channel resources need to be set aside to accommodate RRS transmissions by the UEs. In the present disclosure, we propose an idea for improving the efficiency of SR procedures by assigning/reserving some of the RRS and corresponding resources (i.e. some or all of the data symbols in the resource blocks containing the RRS transmissions) for SR transmissions. A set of Reciprocity Reference Signals, RRS, may comprise one or more RRS whereof each RRS may be transmitted on, and/or using, resources, such as time/frequency resources in LTE. Said time/frequency resources may be an RRS resource. One or more RRSs may be transmitted using one or several RRS resources.

FIG. 1 is a schematic flow diagram illustrating an example of a method for operating a wireless network node in a wireless communication network according to an embodiment. The method comprises providing S10 at least one wireless communication device with an indication of a set of reciprocity reference signals, RRS, to be used for scheduling request, SR, transmission. The method also comprises performing an estimation of an uplink channel on which a scheduling request, SR, is received from a wireless communication device, where the estimation of the uplink channel is based on an RRS comprised in the received SR.

Assuming that we are using Time Division Duplex (TDD) and that the UL/DL channels are reciprocal, the estimation of the UL channel can then be used for estimating a DL channel to be used for transmitting an UL scheduling grant to the wireless communication device. As described above, if the network node knows the DL channel, it can adopt its transmission parameters and achieves a better spectral and power efficiency in sending the UL scheduling grant. Thus, in an embodiment the method illustrated in FIG. 1 further comprises transmitting S30 an uplink scheduling grant to the wireless communication device 20, where the uplink scheduling grant is pre-coded based on the estimation of the uplink channel. A suitable DL pre-coder for the transmitted grant can be calculated based on the RRS comprised in the received SR in an embodiment.

When the wireless communication device sends its scheduling request to the wireless network node, it will select an RRS from the indicated set of RRS and include that in the scheduling request. The RRS comprised in the SR can then be used by the wireless network node to decode the data received with the SR. Thus, in an embodiment the method illustrated in FIG. 1 further comprises decoding S50 a scheduling request, SR, message comprised in the received SR, where the decoding S50 is performed using the RRS comprised in the received SR as a demodulation reference signal, DMRS, for the SR message.

In some embodiments the RRS are assigned to the wireless communication devices in an orthogonal fashion, for example using a method as legacy SR in LTE. Thus, in a particular embodiment of the method illustrated in FIG. 1 the reciprocity reference signals of the indicated set of RRS are orthogonal, i.e. that the inner product of the signals is zero. This means that if two users are transmitting at the same time they are not interfering with each other. Orthogonality can be achieved, for example, in frequency, time and code-domain and any combination of these three types of orthogonality. But in other embodiments each RRS is shared among a set of wireless communication devices. Thus, in another particular embodiment of the method illustrated in FIG. 1 the providing S10 comprises providing a plurality of wireless communication devices 20 with a plurality of indications of sets of RRS to be used for SR transmission, where the indicated sets of RRS are intersecting. This means that for e.g. two wireless communication devices there might be some RRS that are common, but also some that are unique for each of the two wireless communication devices; and these may then in turn be shared by some third wireless communication device.

In some embodiments, the wireless communication device may be configured with different RRS resources to be used as an SR resource depending on some specific criteria, for example on the traffic class. For example, the UEs may be instructed to use $RRS_1$ to $RRS_{K_1}$ for high priority scheduling request, $RRS_{K_1+1}$ to $RRS_{K_2}$ for other scheduling requests. This will help to reduce the collision probability by appropriately assigning RRS resources to different traffic classes. Thus, in an embodiment of the method illustrated in FIG. 1 the providing S10 comprises providing an indication of different sets of RRS to be used for SR transmission for different traffic classes.

In a particular embodiment of the method illustrated in FIG. 1 the wireless network node is a wireless base station.

Figure 2:
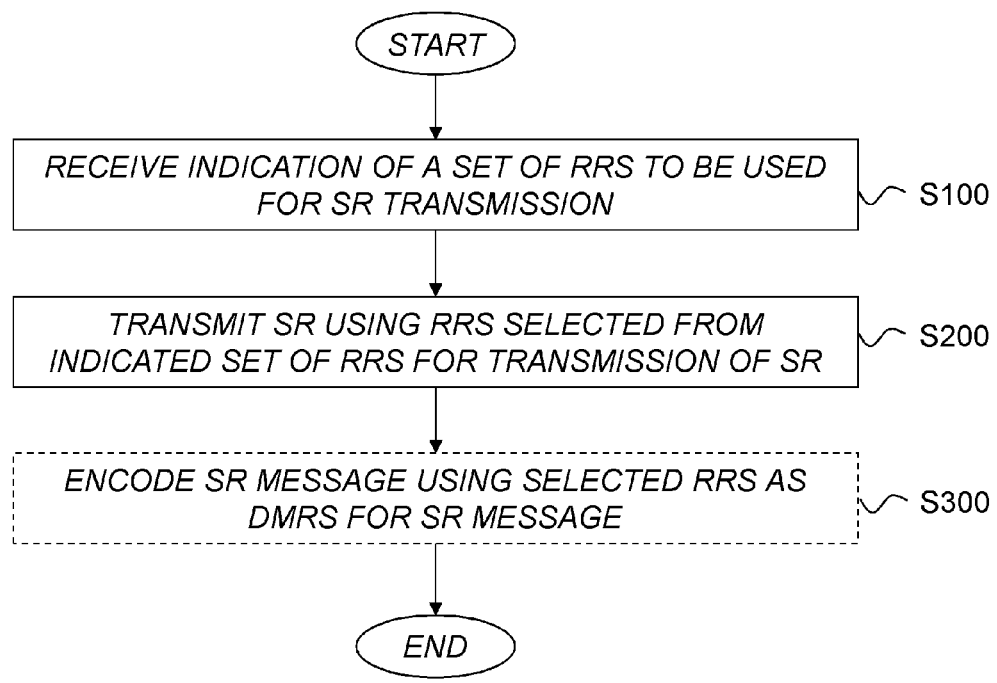
FIG. 2 is a schematic flow diagram illustrating an example of a method for operating a wireless communication device in a wireless communication network according to an embodiment.

FIG. 2 is a schematic flow diagram illustrating an example of a method for operating a wireless communication device in a wireless communication network according to an embodiment. The method comprises receiving S100 an indication of a set of reciprocity reference signals, RRS, to be used for scheduling request, SR, transmission. The method also comprises transmitting S200 a scheduling request, SR, using an RRS selected from the indicated set of RRS for transmission of the SR. In other words, the wireless communication device picks one RRS from the indicated RRS set that constitutes the SR set. Then the wireless communication device uses that RRS and transmits accordingly.

Furthermore, in an embodiment the wireless communication device also encodes the data transmitted in the SR, using the RRS as a DMRS for the data message. Thus, in an embodiment the method illustrated in FIG. 2 further comprises encoding S300 a scheduling request, SR, message using the selected RRS as a demodulation reference signal, DMRS, for the SR message. In a particular embodiment the encoded SR message comprises the selected RRS. Thus, the RRS can be used by the wireless network node to decode the SR message.

In another particular embodiment of the method illustrated in FIG. 2 the encoded SR message further comprises an identity associated with the wireless communication device transmitting said SR. The encoded SR message may also comprise other information in other embodiments of the method illustrated in FIG. 2, such as Channel Quality Indicator, Channel State Information, data buffer status report, power or path gain estimate, configuration of the wireless communication device, mobility measurements, and Hybrid-Automatic Repeat reQuest acknowledgement/negative acknowledgement, HARQ ACK/NACK.

In a particular embodiment of the method illustrated in FIG. 2 the wireless communication device is a user equipment.

In the following, some non-limiting examples of illustrative embodiments are described.

Figure 3:
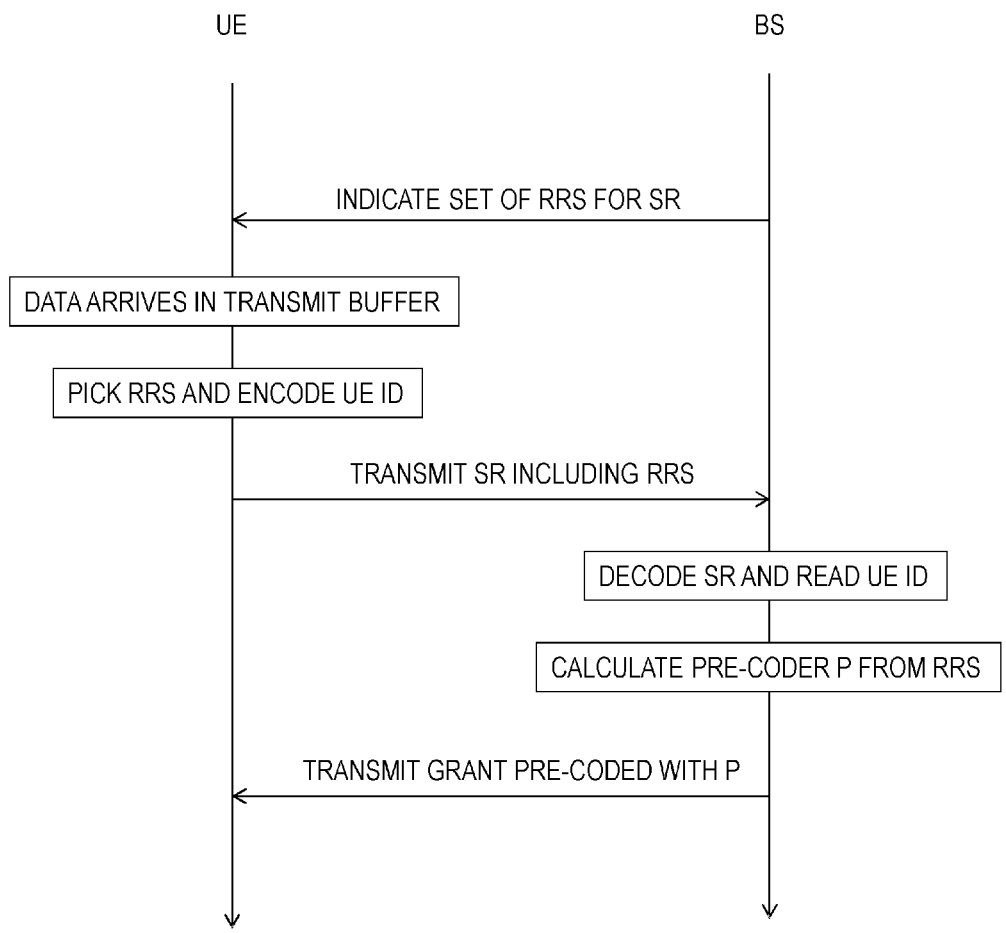
FIG. 3 is a schematic diagram illustrating an example procedure according to an embodiment.

FIG. 3 is a schematic diagram illustrating an example procedure according to an embodiment, where the wireless network node is a base station (BS) and the wireless communication device is a user equipment (UE). As illustrated in the figure, the BS sends information to the UE about a set of RRS to be used for SR transmission. As an example, the UE picks one RRS from the RRS set that constitutes the SR set. Then the UE uses that RRS and transmits accordingly. In an embodiment the UE also encodes its ID (plus some other information in some embodiments), modulates the results and puts them on the 4 OFDM symbol that are left alone. (Note that 4×2×16=128 symbols can be sent which assuming QPSK is equal to 256 coded bits and is sufficiently enough to accommodate the UE ID and some other relevant data).

To continue the example, the base station (BS) now uses the RRS to estimate the UL channel and uses that to decode the SR message, e.g. the UE ID. Also, since we assume it is TDD and the UL/DL channels are reciprocal, the BS also learns the DL channel and can calculate a good DL pre-coder P. Then the BS pre-codes a grant for scheduling of UL resources and transmits the grant to the UE on the estimated DL channel. It is important to note that with having many antennas, the BS can actually decode the data if many UEs transmit simultaneously over the four OFDM symbols, given that the BS is able to learn their channels. Thus the only requirement is that the UEs use orthogonal RRS sequences. If not a collision might occur, and ways for resolving such collisions are proposed below.

Precoding is a generalization of beam-forming to support multi-stream (or multi-layer) transmission in multi-antenna wireless communications. In multi-user MIMO, a multi-antenna transmitter communicates simultaneously with multiple receivers (each having one or multiple antennas). From an implementation perspective, precoding algorithms for such systems can be sub-divided into linear and nonlinear precoding types. The capacity achieving algorithms are nonlinear, but linear precoding approaches usually achieve reasonable performance with much lower complexity. Linear precoding strategies include e.g. maximum ratio transmission (MRT), zero-forcing (ZF) precoding, and transmit Wiener precoding. There are also precoding strategies tailored for low-rate feedback of channel state information, for example random beamforming.

An example of an MRT pre-coder for DL transmissions in a multiple-input single-output (MISO) system with M transmit antennas follows. Mathematically, the effective radio channel can be modeled as $$y = \sqrt{P} h w q + e,$$

where P is the transmitted power, h denotes the downlink M×1 channel vector and $$w = \frac{h^*}{\|h\|}$$

is the 1×M MRT precoder, q is the unit-energy transmitted symbol and e is zero-mean additive white Gaussian noise with variance $\sigma^2$ and hence y represents the received signal at the UE. Observe in a pre-coder calculation in a real implementation we might not be able to use the channel vector h as in the expression above, but rather the pre-coding calculates w with the same formula but using an estimation of h instead. Also observe that in VL-MIMO systems, the channel estimates can be calculated from the UL transmission (assuming UL/DL channel reciprocity). More precisely, considering the same MISO settings as above, the UL channel can be modeled as $$r = \sqrt{P_u} g^T s + n,$$

where $P_u$ is the transmitted power by the UE, g is the 1×M channel vector, s is the transmitted symbol and n represents the noise vector. Now assuming UL/DL channel reciprocity, i.e., assuming that $h = g^T$ (or in fact $h = f(g^T)$ for any known function $f$), then an estimation of UL channel g can be used for estimating the DL channel h.

By using the RRS for estimating the UL channel we can get an estimation of the downlink channel vector h. But we can also extract more information about the communication link between the BS and the UE, such as which rank should be used (e.g. given by the LTE Rank Indicator RI in the LTE CSI reporting), the quality of the reception (given by the LTE Channel Quality Indicator CQI in the LTE CSI reporting) given that we use a pre-coder (given by the LTE Pre-coding Matrix Indicators PMI in the LTE CSI reporting), a quality that uses an estimated interference situation at the UE for the data transmission using a particular pre-coder. This estimate of the DL channel can then be used to calculate different pre-coders as has been mentioned above.

Using the proposed idea, it is possible for the UEs to share RRS resources which enable very short latency. Consider as an example, if 1000 users share 100 RRS and each Transmission Time Interval (TTI) is 0.2 ms and each UE has a 100 ms inter-packet arrival time, then the collision probability is less than 2%, hence almost always a SR is successful in the next UL subframe (observe that the SR can be successful even in the case collision, see above). Furthermore, as the SR includes an $RRS_1$, a low overhead DL transmission is possible as a response to the SR, e.g. a UL-scheduling grant and any other relevant data. Observe that for the example, if orthogonal SR are used the latency would increase significantly e.g. instead of slightly more than 0.2 ms (plus any DL subframes), we would need 2 ms (1000 users 100 SR per TTI→10 subframes).

As an example let's say the RRS transmission spans two resource blocks in frequency and also let us say that the resource block has 12 OFDM symbols and spans 16 OFDM subcarriers (in LTE each Resource Block Pair, RBP, is 14 symbol×12 subcarriers, but in this example these numbers are chosen to show the general future structure and can be any arbitrary values) and from those 8 are used for RRS transmissions. This means that 4 OFDM symbols are left alone for data transmissions. These symbols will be shared by all users (to be made clear in what follows) and by using orthogonal cover codes, around 80 orthogonal RRS sequences can be transmitted over these 2 resource blocks. Hence for large data transmissions we typically allocate the complete bandwidth; hence we are limited to 80 data users. But for narrowband transmissions there is the possibility to schedule many more UEs using RRS, e.g. for 100 resources blocks and 2 resource block long sequences there is actually 50×10×8=4000 orthogonal-RRS-sequences. Hence, as an example we propose to assign e.g. 100 narrowband RRS sequences and the corresponding narrowband resources (i.e. also all or some of the data symbols in the resource blocks containing the RRS transmissions) to UEs to use as SR. This then leaves RRSs for 78 wide-band data transmissions in this example. In some embodiments the users are assigned these in an orthogonal fashion (for example using the method as legacy SR in LTE). But in a particular embodiment each RRS is shared among a set of users. It is worth noting that the RRS during the said SR transmission acts as a demodulation reference symbol for any data that the UE transmits in the SR transmission and hence the UE can encode its user identity in the data part (the 4 OFDM symbols mentioned above) of the SR transmission in the resource blocks assigned for the UE. In some embodiments the data transmission also contains, for example, CQI, CSI, data buffer status report, power/pathgain estimate, UE configuration, mobility measurements, data, or some other control signaling such as HARQ ACK/NACK. The RRS in the SR is further used for calculating a narrowband beamformed DL transmission where the UL scheduling grant is included. In particular buffer status report and power/pathgain estimate can be beneficial for the base-station to know when assigning UL resources to the UE. This is because the buffer status tells the maximum number of bits that the UE can transmit e.g. there is no need to assign more resources, and the path-gain estimate tells the base-station how much frequency resources the UE can use before it becomes power limited (i.e. cannot maintain the received power density target set by the base-station).

As explained briefly above, the proposed idea of this disclosure is to provide a group of UEs with an indication of a set of RRS for the purpose of SR. Each SR in this context includes both a randomly picked RRS within a set of RRS (a set contains potentially only a single RRS) and a format for a data message within which data such as e.g. the UE identity is encoded. In a particular embodiment the RRS also acts as the DMRS for the data message. Furthermore, the RRS can be used to calculate a downlink pre-coder.

Thus, all the UEs know that in order to send a scheduling request message, they can pick one of the RRS from the assigned set. However, which one to use is subject to different embodiments. In some embodiments, this set of RRS is shared among all the UEs. Then each UE just picks one RRS from the set, e.g. at random. If two UEs happen to choose the same RRS, then the BS might not be able to decode/detect the message. This is referred to as collision and proposals for resolving this issue are described below. If the BS manages to decode the message, it can use the RRS to estimate the DL channel and hence send the response using an appropriately chosen/calculated pre-coder. In other embodiments, the UEs may be allocated specific RRS from the set, for instance orthogonal RRS sequences to avoid collisions.

In the configuration of the SR, the UE is configured with a set of RRS in an embodiment. Each RRS is mapped to a set of frequency resources. In order to make the RRS act as an DMRS for the data transmission the frequency resources for the data transmission should be a subset of the frequency resources spanned by the RRS (observe that the RRS might use a Comb and hence data could be mapped to sub-carriers that do not contain RRS, but using interpolation it is still possible to use the RRS as DMRS). Further the UE will make a random choice among the set of available RRS resources; in a particular embodiment the UE will uniformly pick among the resources in a single UL-TTI.

As described above the data will be encoded in a subset of the frequency domain that can be interpolated or extrapolated from the frequency domain resources containing RRS. In some embodiments a single set of such resources is associated with each RRS. In some embodiments a set of different such resources is associated with an RRS. In some embodiments the data encoding is done over different (pseudo-) orthogonal resources, for example, in code, frequency or time domain. Hence if the RRSs are colliding the base station can still decode the multiple messages if said messages are in orthogonal resources. In some other embodiments only a single resource is used and if two users are colliding the SR message is typically lost, but said single resource is more efficient (e.g. can contain more data).

The data format is encoded with or using the UE (local) identity, for example as a data pay-load or using the UE identity in the Cyclic Redundancy Check (CRC) check sum generation, for example, in the same way as done in DL-grants for LTE. The data format can also include additional control data, e.g. buffer status report(s). But in some embodiments the SR also contains a small amount of data, for example, for Critical-Machine Type Communication (MTC) services. In some embodiments, users who can transmit data are assigned more wide-bandwidth RRS for SR compared to other users that cannot transmit data in SR transmission.

If two users are using the same SR and the base station cannot decode the two messages, or if the base station cannot decode the SR for some other reason, the UE(s) should retransmit the SR(s). In one embodiment the UEs should make a new random choice for the retransmission to avoid further collisions. The random choice can be which RRS to use, which data format to use and also a random waiting time. The waiting time is similar to a prohibit time in that it should be sufficient to allow the base station to respond to the SR. The difference compared to LTE is that the waiting time is dependent on the coherence time of the UE and also on the collision probability. But in principal the waiting time is a prohibit time that will increase (at least in expected value) for each attempt and always include a minimal time and at least one DL subframe (or N DL subframes), for example, always wait 1 ms and at least 2 DL subframes plus an exponential random time that increases for each failed attempt. Observe that a maximum number of SR attempts can also exist in some embodiments.

One idea of the proposed solution is to indicate that a set of, i.e. part of, the RRS should be used for SR transmission. Corresponding RRS resources are then used as parts of an SR resource, where the RRS may also be used for estimating the UL channel on which an SR is received, and assuming reciprocity, also the DL channel for transmitting UL-grants. The RRS may also act as a DMRS for decoding of data received in some UL-transmissions, such as an SR message received in an SR. In a particular embodiment multiple users can share the same RRS but have unique identifiers in encoded data, decodable using the RRS as DMRS. Using the proposed idea, it is possible for the UEs to share RRS resources which enable very short latency.

As used herein, the non-limiting term "wireless network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the non-limiting terms "wireless communication device" and "User Equipment (UE)" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as a non-limiting term comprising any type of wireless device communicating with a network node in a wireless communication system and/or possibly communicating directly with another wireless communication device. In other words, a wireless communication device may be any device equipped with circuitry for wireless communication according to any relevant standard for communication.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an embodiment, a wireless network node is configured to operate in a wireless communication network. The wireless network node is configured to provide at least one wireless communication device with an indication of a set of reciprocity reference signals, RRS, to be used for scheduling request, SR, transmission. The wireless network node is also configured to perform an estimation of an uplink channel on which a scheduling request, SR, is received from a wireless communication device, where the estimation of the uplink channel is based on an RRS comprised in the received SR.

In a particular embodiment the wireless network node 10 is further configured to transmit an uplink scheduling grant to the wireless communication device, where the uplink scheduling grant is pre-coded based on the estimation of the uplink channel.

In another particular embodiment the wireless network node is further configured to decode a scheduling request, SR, message comprised in the received SR, using the RRS comprised in the received SR as a demodulation reference signal, DMRS, for the SR message.

In one particular embodiment the reciprocity reference signals of the indicated set of RRS are orthogonal. In an alternative embodiment the wireless network node is instead configured to provide a plurality of wireless communication devices with a plurality of indications of sets of RRS to be used for SR transmission, where the indicated sets of RRS are intersecting.

In a particular embodiment the wireless network node is configured to provide an indication of different sets of RRS to be used for SR transmission for different traffic classes.

Figure 4:
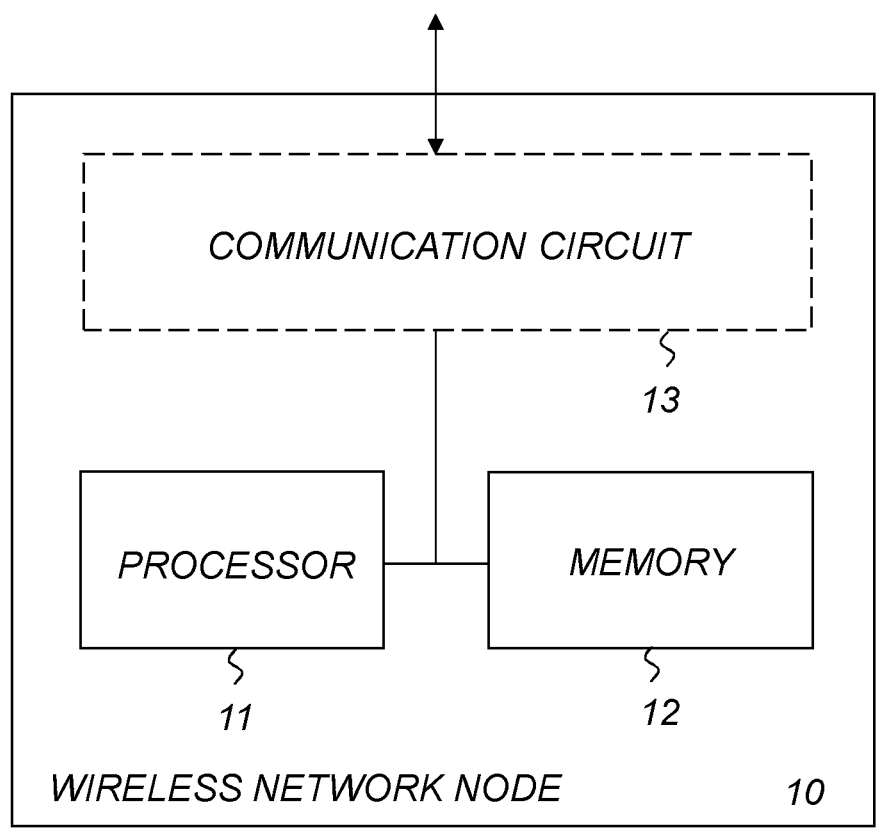
FIG. 4 is a schematic diagram illustrating an example of a wireless network node configured to operate in a wireless communication network according to an embodiment.

FIG. 4 is a schematic block diagram illustrating an example of a wireless network node 10, based on a processor-memory implementation according to an embodiment. In this particular example, the wireless network node 10 comprises a processor 11 and a memory 12, the memory 12 comprising instructions executable by the processor 11, whereby the processor is operative to provide at least one wireless communication device with an indication of a set of reciprocity reference signals, RRS, to be used for scheduling request, SR, transmission, and to perform an estimation of an uplink channel on which a scheduling request, SR, is received from a wireless communication device, where the estimation of the uplink channel is based on an RRS comprised in the received SR.

In a particular embodiment of the wireless network node 10 illustrated in FIG. 4 the processor 11 is further operative to prepare an uplink scheduling grant for transmission to the wireless communication device 20, where the uplink scheduling grant is pre-coded based on the estimation of the uplink channel.

In another particular embodiment of the wireless network node 10 illustrated in FIG. 4 the processor 11 is further operative to decode a scheduling request, SR, message comprised in the received SR, using the RRS comprised in the received SR as a demodulation reference signal, DMRS, for the SR message.

As indicated in FIG. 4 the wireless network node 10 may optionally include communication circuitry 13 for communication with one or more other network nodes and/or devices. Thus, in an embodiment the wireless network node 10 comprises communication circuitry 13 configured to transmit the indication of a set of reciprocity reference signals, RRS, to be used for scheduling request, SR, transmission to at least one wireless communication device.

In a particular embodiment of the wireless network node 10 illustrated in FIG. 4 the communication circuitry 13 is further configured to transmit an uplink scheduling grant to the wireless communication device, where the uplink scheduling grant is pre-coded based on the estimation of the uplink channel.

In a particular embodiment of the wireless network node illustrated in FIG. 4 the wireless network node is a wireless base station.

According to an embodiment, a wireless communication device is configured to operate in a wireless communication network. The wireless communication device is configured to receive an indication of a set of reciprocity reference signals, RRS, to be used for scheduling request, SR, transmission. The wireless communication device is also configured to transmit a scheduling request, SR, using an RRS selected from the indicated set of RRS for transmission of the SR.

In an embodiment the wireless communication device is further configured to encode a scheduling request, SR, message using the selected RRS as a demodulation reference signal, DMRS, for the SR message.

In a particular embodiment the encoded SR message comprises the selected RRS. In another particular embodiment the encoded SR message further comprises an identity associated with a wireless communication device transmitting the SR. In yet another particular embodiment the encoded SR message further comprises at least one of a Channel Quality Indicator, Channel State Information, a data buffer status report, a power or path gain estimate, configuration of the wireless communication device, mobility measurements, and Hybrid-Automatic Repeat reQuest acknowledgement/negative acknowledgement, HARQ ACK/NACK.

Figure 5:
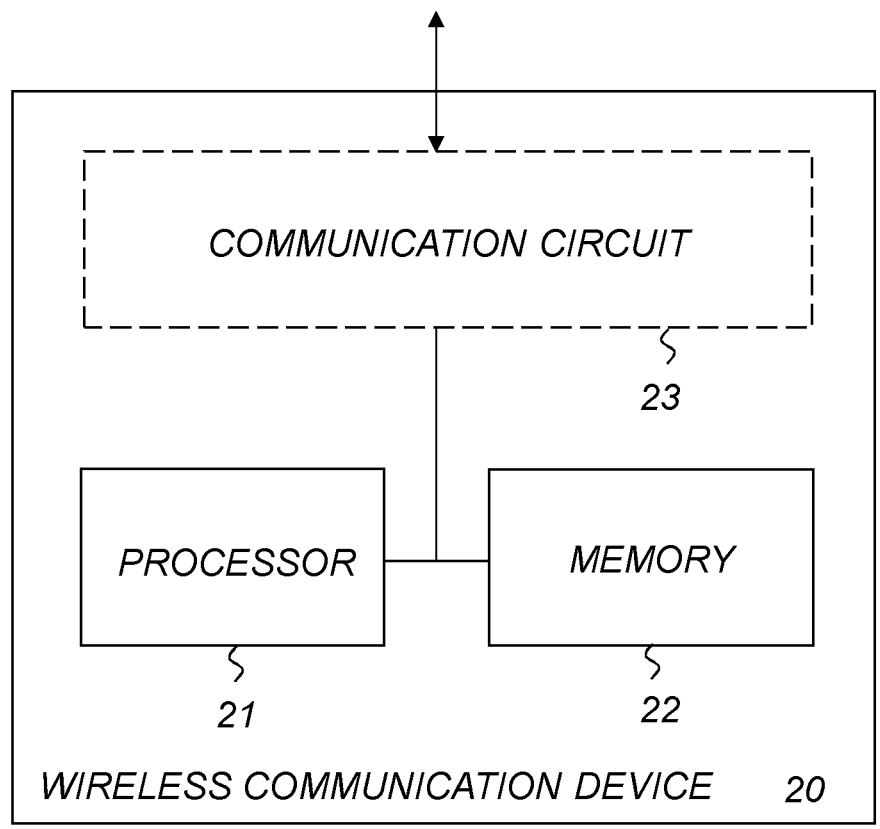
FIG. 5 is a schematic diagram illustrating an example of a wireless communication device configured to operate in a wireless communication network according to an embodiment.

FIG. 5 is a schematic block diagram illustrating an example of a wireless communication device 20, based on a processor-memory implementation according to an embodiment. In this particular example, the wireless communication device 20 comprises a processor 21 and a memory 22, the memory 22 comprising instructions executable by the processor 21, whereby the processor is operative to obtain an indication of a set of reciprocity reference signals, RRS, to be used for scheduling request, SR, transmission, and to prepare a scheduling request, SR, for transmission, wherein an RRS selected from the indicated set of RRS is to be used for transmission of the SR.

In a particular embodiment of the wireless communication device 20 illustrated in FIG. 5 the processor 21 is further operative to encode a scheduling request, SR, message using the selected RRS as a demodulation reference signal, DMRS, for the SR message.

As indicated in FIG. 5 the wireless communication device 20 may optionally include communication circuitry 23 for communication with one or more other network nodes and/or devices. Thus, in an embodiment the wireless communication device comprises communication circuitry 23 configured to receive an indication of a set of reciprocity reference signals, RRS, to be used for scheduling request, SR, transmission, and to transmit a scheduling request, SR, using an RRS selected from the indicated set of RRS for transmission of the SR.

In a particular embodiment of the wireless communication device illustrated in FIG. 5 the wireless network node is a user equipment.

The communication circuits 13; 23 described above may include functions for wired and/or wireless communication with other devices and/or network nodes in the network. In a particular example, the communication circuits 13; 23 may be based on radio circuitry for communication with one or more other nodes, including transmitting and/or receiving information. The communication circuits 13; 23 may be interconnected to the respective processor 11; 21 and/or memory 12; 22. By way of example, the communication circuits 13; 23 may include any of the following: a receiver, a transmitter, a transceiver, input/output (I/O) circuitry, input port(s) and/or output port(s).

Figure 6:
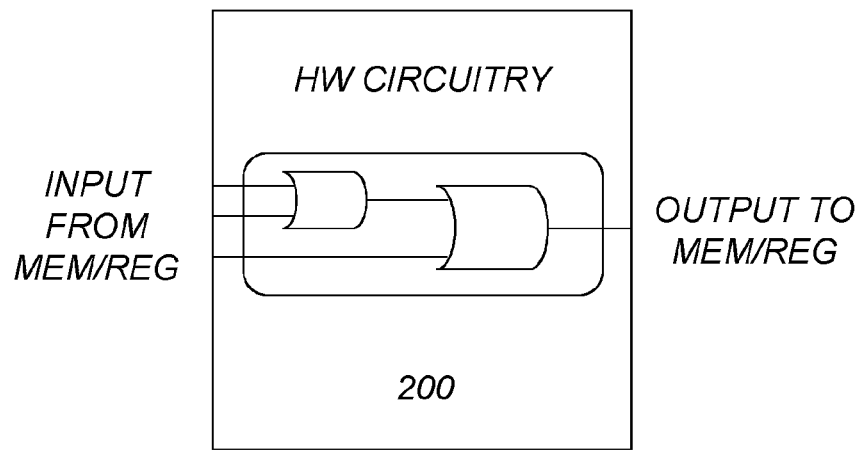
FIG. 6 is a schematic block diagram illustrating an example of an implementation of an arrangement that can be used in a wireless network node and/or a wireless communication device according to an embodiment.

FIG. 6 is a schematic block diagram illustrating an example of an implementation of an arrangement 200 that can be used in a wireless network node and/or a wireless communication device. The arrangement 200 is based on a hardware circuitry implementation according to an embodiment. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 7:
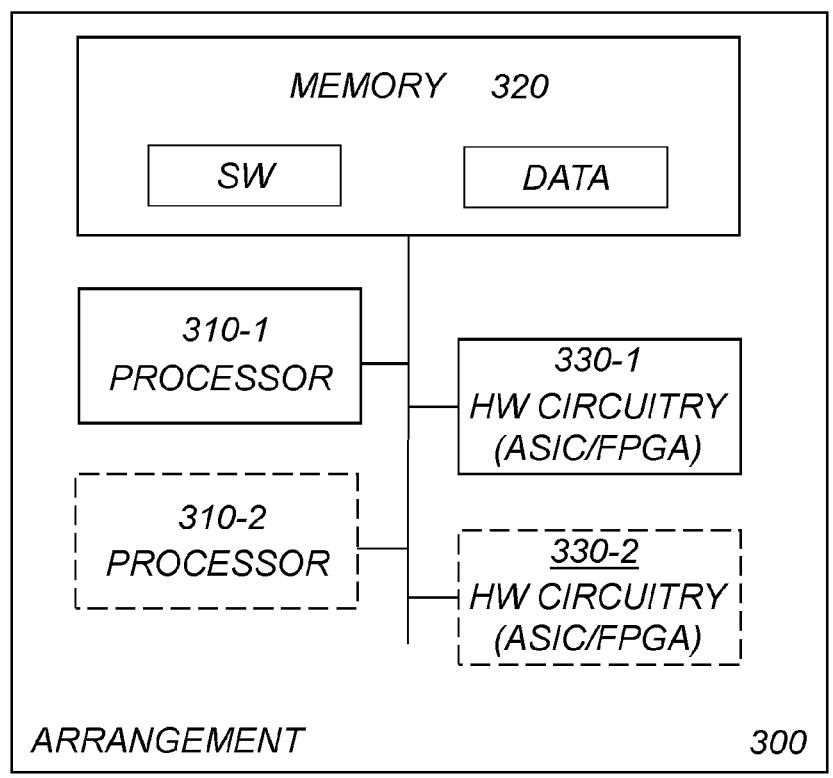
FIG. 7 is a schematic block diagram illustrating another example of an implementation of an arrangement that can be used in a wireless network node and/or a wireless communication device according to an alternative embodiment.

FIG. 7 is a schematic block diagram illustrating another example of an implementation of an arrangement 300 that can be used in a wireless network node and/or a wireless communication device. The arrangement 300 is based on combination of both processor(s) 310-1, 310-2 and hardware circuitry 330-1, 330-2 in connection with suitable memory unit(s) 320. The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software, SW, for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 8:
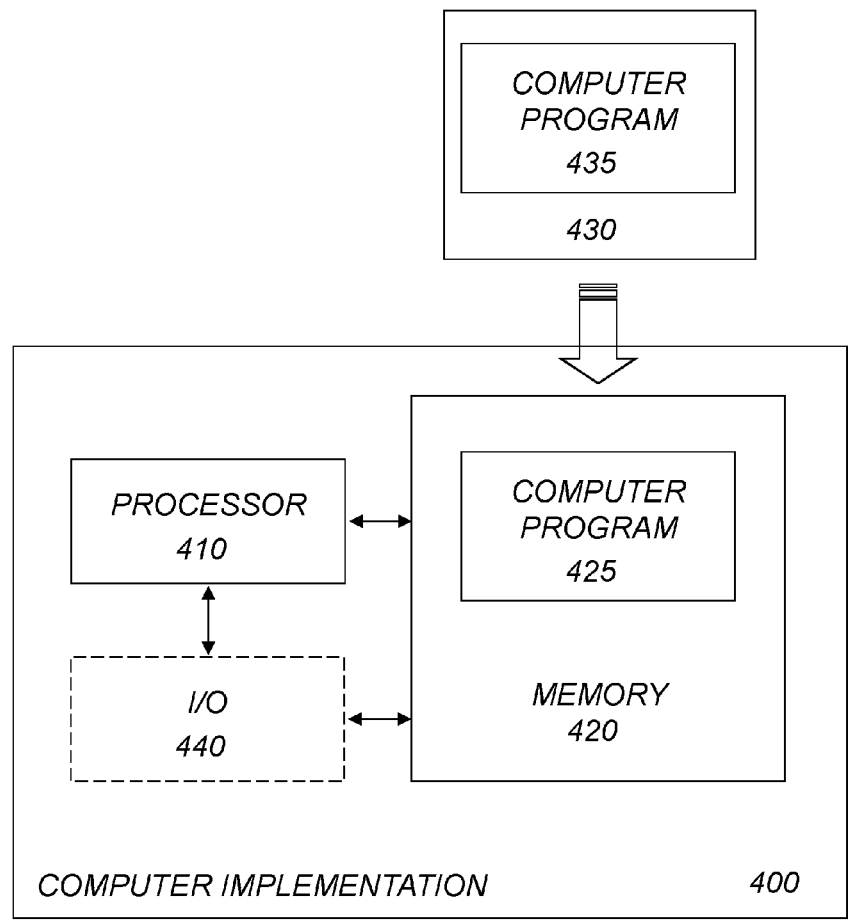
FIG. 8 is a schematic diagram illustrating an example of a computer-implementation according to an embodiment.

FIG. 8 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term "processor" should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to provide at least one wireless communication device with an indication of a set of reciprocity reference signals, RRS, to be used for scheduling request, SR, transmission, and to perform an estimation of an uplink channel on which a scheduling request, SR, is received from a wireless communication device, wherein the estimation of the uplink channel is based on an RRS comprised in the received SR.

In another particular embodiment, the computer program 425; 435 comprises further instructions, which when executed by at least one processor 410, cause the processor(s) 410 to prepare an uplink scheduling grant for transmission to said wireless communication device, said uplink scheduling grant being pre-coded based on the estimation of the uplink channel.

In yet another particular embodiment, the computer program 425; 435 comprises further instructions, which when executed by at least one processor 410, cause the processor(s) 410 to decode a scheduling request, SR, message comprised in the received SR, using the RRS comprised in the received SR as a demodulation reference signal, DMRS, for the SR message.

In a particular embodiment, the computer program 425; 435 comprises instructions, which when executed by at least one processor 410, cause the processor(s) 410 to obtain an indication of a set of reciprocity reference signals, RRS, to be used for scheduling request, SR, transmission, and to prepare a scheduling request, SR, for transmission, wherein an RRS selected from the indicated set of RRS is to be used for transmission of said SR.

In another particular embodiment, the computer program 425; 435 comprises further instructions, which when executed by at least one processor 410, cause the processor(s) 410 to encode a scheduling request, SR, message using the selected RRS as a demodulation reference signal, DMRS, for said SR message.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 as described above may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 9:
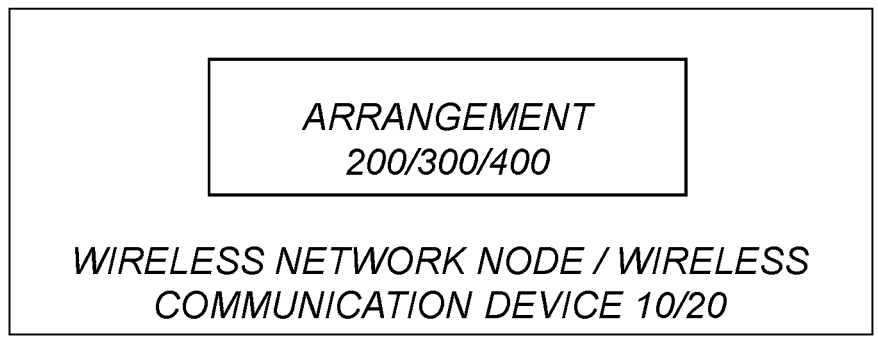
FIG. 9 is a schematic block diagram illustrating an example of a wireless network node or wireless communication device comprising an arrangement according to any of the embodiments.

FIG. 9 is a schematic block diagram illustrating an example of a wireless network node 10/wireless communication device 20 comprising an arrangement 200; 300; 400 according to any of the embodiments.

According to an aspect, there is provided a wireless network node 10 comprising an arrangement 200; 300; 400 as described herein. By way of example, the wireless network node may be a suitable network node such a base station or an access point. However, the wireless network node may alternatively be a cloud-implemented network device.

According to another aspect, there is provided a wireless communication device 20 in a wireless communication system, wherein the wireless communication device 20 comprises an arrangement 200; 300; 400 as described herein. The wireless communication device may be any suitable communication device in the wireless communication system. By way of example, the wireless communication device may be a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 10:
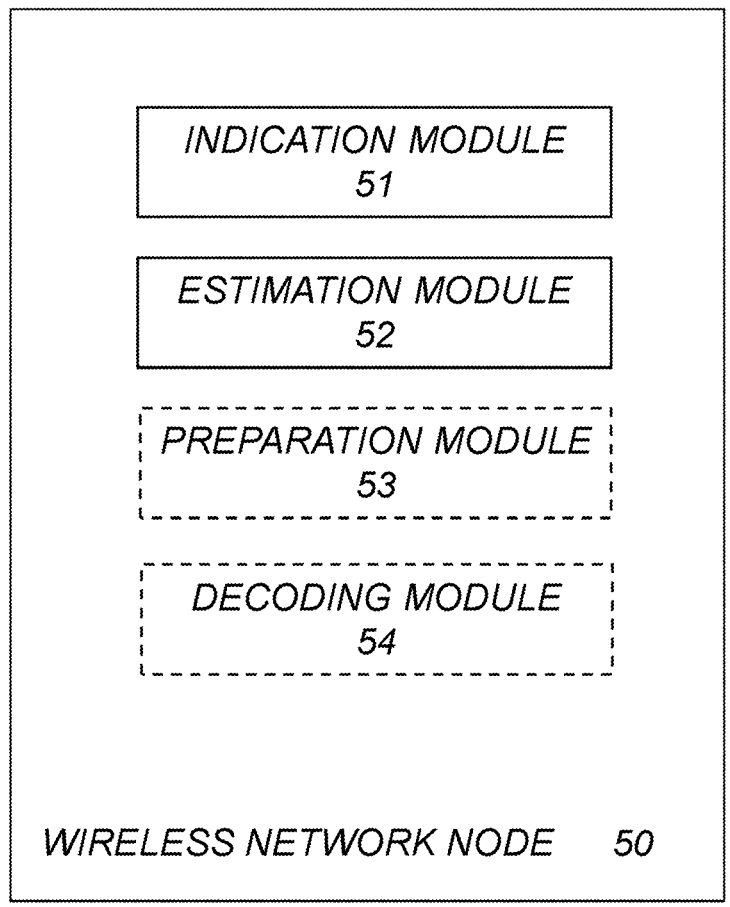
FIG. 10 is a schematic diagram illustrating an example of a wireless network node for operating in a wireless communication network according to an embodiment.

FIG. 10 is a schematic diagram illustrating an example of a wireless network node 50 for operating in a wireless communication network. The wireless network node 50 in this embodiment comprises an indication module 51 for providing at least one wireless communication device with an indication of a set of reciprocity reference signals, RRS, to be used for scheduling request, SR, transmission. The wireless network node 50 further comprises an estimation module 52 for performing an estimation of an uplink channel on which a scheduling request, SR, is received from a wireless communication device, wherein the estimation of the uplink channel is based on an RRS comprised in the received SR.

Optionally, the wireless network node 50 may in a particular embodiment also comprise a preparation module 53 for preparing an uplink scheduling grant for transmission to the wireless communication device, where the uplink scheduling grant is pre-coded based on the estimation of the uplink channel. The wireless network node 50 may in another particular embodiment comprise an optional decoding module 54 for decoding a scheduling request, SR, message comprised in the received SR, using the RRS comprised in the received SR as a demodulation reference signal, DMRS, for the SR message.

Figure 11:
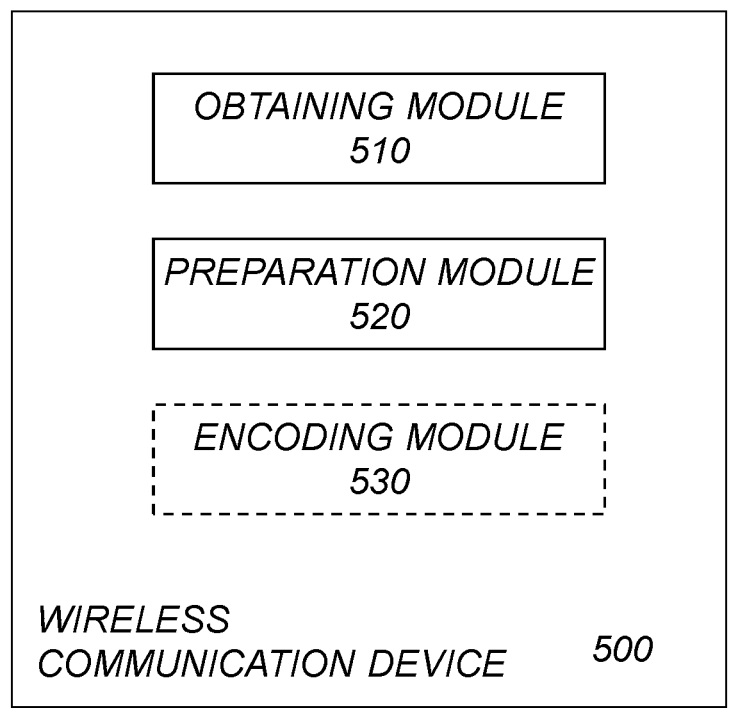
FIG. 11 is a schematic diagram illustrating an example of a wireless communication device for operating in a wireless communication network according to an embodiment.

FIG. 11 is a schematic diagram illustrating an example of a wireless communication device 500 for operating in a wireless communication network. The wireless communication device 500 in this embodiment comprises an obtaining module 510 for obtaining an indication of a set of reciprocity reference signals, RRS, to be used for scheduling request, SR, transmission. The wireless communication device 500 further comprises a preparation module 520 for preparing a scheduling request, SR, for transmission, wherein an RRS selected from the indicated set of RRS is to be used for transmission of the SR. Optionally, the wireless communication device 500 may in a particular embodiment also comprise an encoding module 530 for encoding a scheduling request, SR, message using the selected RRS as a demodulation reference signal, DMRS, for the SR message.

Alternatively it is possible to realize the module(s) in FIG. 10 and FIG. 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 12:
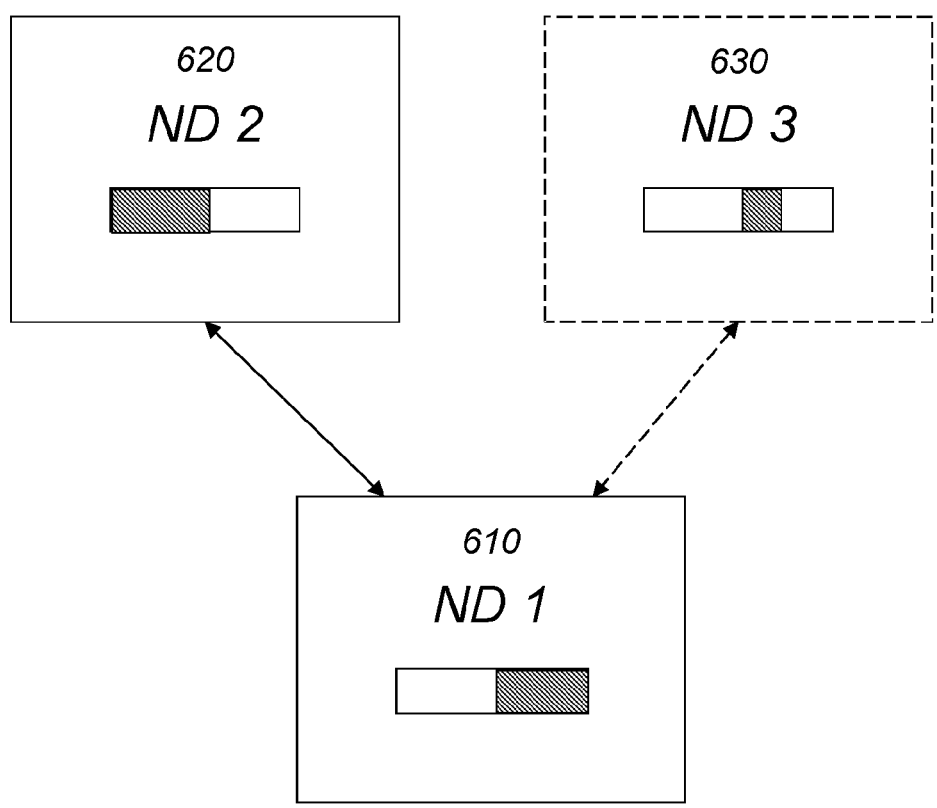
FIG. 12 is a schematic diagram illustrating an example of how functionality can be distributed or partitioned between different network devices in a general case.

FIG. 12 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 13:
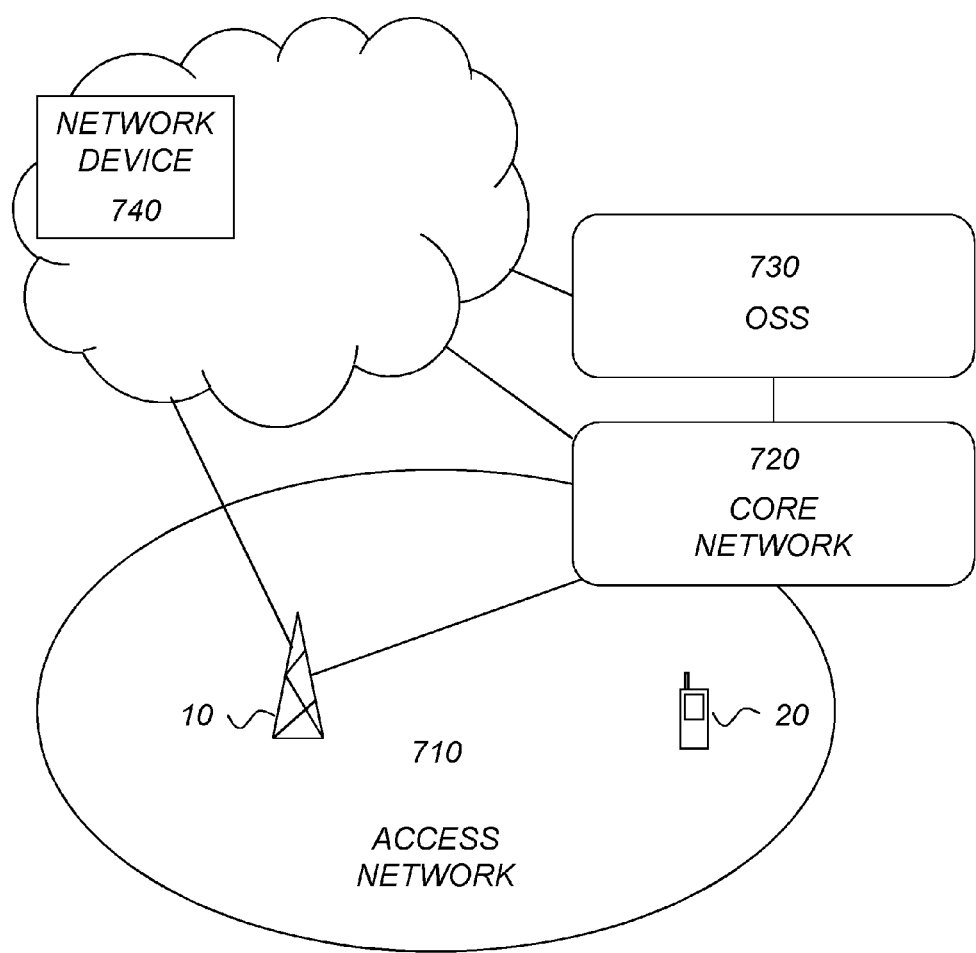
FIG. 13 is a schematic diagram illustrating an example of a wireless communication system.

FIG. 13 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 36.211 (Physical channels and modulation) V10.0.0
[2] 3GPP TS 36.321 (MAC) V8.0.0

The invention claimed is:

1. A method for operating a wireless network node in a wireless communication network, wherein said method comprises:
   providing at least one wireless communication device with an indication of a set of reciprocity reference signals (RRS) to be used for scheduling request (SR) transmission, wherein the RRS are reference signals transmitted on uplink channels by the at least one wireless communication device, wherein each RRS, from the indicated set of RRS, is associated with a set of frequency resources, and wherein an RRS is selected randomly from the indicated set of RRS, and a set of frequency resources, corresponding to the selected RRS, is used as an SR resource;
   decoding an SR message comprised in an SR received from a wireless communication device, wherein said decoding is performed using an RRS comprised in the received SR as a demodulation reference signal (DMRS) for the SR message; and
   performing an estimation of an uplink channel on which the SR is received from the wireless communication device, wherein the estimation of the uplink channel is based on the RRS comprised in the received SR.

2. The method of claim 1, further comprising transmitting an uplink scheduling grant to said wireless communication device, said uplink scheduling grant being pre-coded based on the estimation of the uplink channel.

3. The method of claim 1, wherein the RRS of the indicated set of RRS are orthogonal.

4. The method of claim 1, wherein said providing comprises providing a plurality of wireless communication devices with a plurality of indications of sets of RRS to be used for SR transmission, and wherein the indicated sets of RRS are intersecting.

5. The method of claim 1, wherein said providing comprises providing an indication of different sets of RRS to be used for SR transmission for different traffic classes.

6. The method of claim 1, wherein said wireless network node is a wireless base station.

7. A method for operating a wireless communication device in a wireless communication network, wherein said method comprises:
   receiving an indication of a set of reciprocity reference signals (RRS) to be used for scheduling request (SR) transmission;
   selecting an RRS randomly from the indicated set of RRS;
   encoding an SR message, comprised in an SR, using the selected RRS as a demodulation reference signal (DMRS) for said SR message; and
   transmitting the SR using the selected RRS from the indicated set of RRS for the SR transmission.

8. The method of claim 7, wherein the encoded SR message comprises the selected RRS.

9. The method of claim 7, wherein the encoded SR message comprises an identity associated with the wireless communication device transmitting said SR.

10. The method of claim 7, wherein the encoded SR message comprises at least one of:
a Channel Quality Indicator,
Channel State Information,
a data buffer status report,
a power or path gain estimate,
configuration of the wireless communication device,
mobility measurements, and
Hybrid-Automatic Repeat reQuest acknowledgement/negative acknowledgement (HARQ ACK/NACK).

11. The method of claim 1, wherein said wireless communication device is a user equipment.

12. A wireless network node comprising:
communication circuitry;
a processor operatively coupled to the communication circuitry; and
a memory operatively coupled to the processor and comprising instructions executable by the processor, whereby the processor is configured to:
provide, via the communication circuitry, at least one wireless communication device with an indication of a set of reciprocity reference signals (RRS) to be used for scheduling request (SR) transmission, wherein the RRS are reference signals transmitted on uplink channels by the at least one wireless communication device, wherein each RRS, from the indicated set of RRS, is associated with a set of frequency resources, and wherein an RRS is selected randomly from the indicated set of RRS, and a set of frequency resources, corresponding to the selected RRS, is used as an SR resource;
decode, via the communication circuitry, an SR message comprised in an SR received from a wireless communication device, using an RRS comprised in the received SR as a demodulation reference signal (DMRS) for the SR message; and
perform an estimation of an uplink channel on which the SR is received from the wireless communication device, via the communication circuitry, wherein the estimation of the uplink channel is based on the RRS comprised in the received SR.

13. The wireless network node of claim 12, wherein the processor is further configured to transmit an uplink scheduling grant to said wireless communication device, via the communication circuitry, said uplink scheduling grant being pre-coded based on the estimation of the uplink channel.

14. The wireless network node of claim 12, wherein the RRS of the indicated set of RRS are orthogonal.

15. The wireless network node of claim 12, wherein the processor is configured to provide a plurality of wireless communication devices with a plurality of indications of sets of RRS to be used for SR transmission, and wherein the indicated sets of RRS are intersecting.

16. The wireless network node of claim 12, wherein the processor is configured to provide an indication of different sets of RRS to be used for SR transmission for different traffic classes.

17. The wireless network node of claim 12, wherein the processor is further configured to transmit an uplink scheduling grant to said wireless communication device, via the communication circuitry, said uplink scheduling grant being beam-formed based on the estimation of the uplink channel.

18. A wireless communication device configured to operate in a wireless communication network, the wireless communication device comprising:
communication circuitry;
a processor operatively coupled to the communication circuitry; and
a memory operatively coupled to the processor and comprising instructions executable by the processor, whereby the processor is configured to:
receive, via the communication circuitry, an indication of a set of reciprocity reference signals (RRS) to be used for scheduling request (SR) transmission;
select, via the communication circuitry, an RRS randomly from the indicated set of RRS;
encode, via the communication circuitry, an SR message, comprised in an SR, using the selected RRS as a demodulation reference signal (DMRS) for said SR message; and
transmit the SR, via the communication circuitry, using the selected RRS from the indicated set of RRS for the SR transmission.

19. The wireless communication device of claim 18, wherein the encoded SR message comprises the selected RRS.

20. The wireless communication device of claim 18, wherein the encoded SR message comprises an identity associated with the wireless communication device transmitting said SR.

21. The wireless communication device of claim 18, wherein the encoded SR message comprises at least one of:
a Channel Quality Indicator,
Channel State Information,
a data buffer status report,
a power or path gain estimate,
configuration of the wireless communication device,
mobility measurements, and
Hybrid-Automatic Repeat reQuest acknowledgement/negative acknowledgement (HARQ ACK/NACK).

* * * * *